(12) United States Patent
deCarmo

(10) Patent No.: US 6,567,979 B1
(45) Date of Patent: May 20, 2003

(54) METHOD AND APPARATUS FOR ENFORCING DVD PARENTAL CONTROL ACROSS AN ENTERPRISE

(75) Inventor: Linden A. deCarmo, Plantation, FL (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/220,090

(22) Filed: Dec. 23, 1998

(51) Int. Cl.[7] ................................................. H04N 7/16
(52) U.S. Cl. ........................................... 725/25; 725/28
(58) Field of Search ....................... 709/224; 725/25–35, 725/87–104; 386/94, 125–126

(56) References Cited

U.S. PATENT DOCUMENTS 5,550,575 A * 8/1996 West et al. ................. 380/240
5,973,683 A * 10/1999 Cragun et al. .............. 345/719
6,009,433 A * 12/1999 Kurano et al. .............. 369/272
6,259,443 B1 * 7/2001 Williams, Jr. .............. 345/716

* cited by examiner

Primary Examiner—Andrew Faile
Assistant Examiner—Christopher Nalevanko
(74) Attorney, Agent, or Firm—Kudirka & Jobse, LLP

(57) ABSTRACT

A parental management controller for use in a DVD environment is disclosed that defines, in a distributive computer environment, department, country, or corporate controls over DVD content viewed by machines within the environment. The controller provides automated parental management installation on remote machines. It provides parental management enforcement on remote machines. It adjusts the default parental management enforcement level to local cultures and moral values. The controller also provides a logging of any parental management violations on local machines.

13 Claims, 4 Drawing Sheets

METHOD AND APPARATUS FOR ENFORCING DVD PARENTAL CONTROL ACROSS AN ENTERPRISE

FIELD OF THE INVENTION

This invention relates generally to improvements in digital versatile disc systems and, more particularly, to a ensuring parental blocks across an enterprise, such as a video subscription service or the Internet.

BACKGROUND OF THE INVENTION

Digital versatile discs (DVDs) are information storage devices used for storing prerecorded audio information, movies and computer software. The storage mechanism used in DVDs closely resembles that used in compact discs (CDs). DVD players also use the same laser technology as CD players. Briefly, both DVDs and CDs store information as a pattern of pits formed in a metallic substrate. The pit patterns form digital words that can be read by shining a laser beam on the disc surface and detecting the reflected beam. The information storage capacity of a typical DVD, however, is much higher than a CD. Presently available DVDs have a variety of capacities that depend on the technology used to manufacture the discs. Single-layer technologies can be either single or double-sided with capacities of 4.7 gigabytes and 9.4 gigabytes, respectively. Dual layer technologies that use single or double-sided capacities that hold approximately 8.5 gigabytes per side are available. This high information storage capacity makes DVDs suitable for storing not only audio information, but also video information and large amounts of computer data as well.

DVD players have many CD player features, such as the ability to play selections in any order desired and the ability to read information from any point on the disc. However, DVDs can store information in several formats. For example, DVDs which are used to store video information, hereinafter called DVD-VIDEO discs, may use various known information compression algorithms, such as MPEG-2 for video compression/decompression. A DVD may also include high fidelity sound as well. In addition, a DVD may also store uncompressed linear pulse code modulated data streams that have sample rates between 48–96 kHz and are sampled at 16 or 24 bits. Still other DVD versions, hereinafter called DVD-ROM. discs, can store digital data for computer use. The data may also be compressed on these discs.

Although DVD-ROM and DVD-VIDEO discs share compression algorithms, the data format on DVD-VIDEO discs is significantly different than the data format found on DVD-ROM discs. One important difference is that the data content on DVD-ROM is platform-specific, while DVD-VIDEO discs operate with a platform independent navigation engine for playing interactive movies. This navigation engine requires that the files on the DVD-VIDEO disc be referenced in a predetermined directory structure.

The specific navigational commands, which are recognized by a DVD player, are controlled by a device independent language and a set of DVD player parameters that define the current state of the DVD player. The DVD command set, including the aforementioned commands and their definitions, are published in the DVD specification. A copy of the *DVD 1.0 Specification for Read-Only Disc Vol. 3*, including a more detailed description of all DVD commands, may be obtained, for example, from Toshiba Corp., 1-1 Shibaura 1-Chome, Minato-ku, Tokyo 105-01 Japan. In particular, each DVD-VIDEO disc contains a main directory denoted as a VIDEO_TS directory which contains two types of files distinguished with the file extensions .IFO and .VOB. During playback, these files are sorted by a DVD video player to form video "title" sets, which are groupings of all files necessary to play a particular DVD video "title", for example, a movie. Each video title set is composed of one .IFO file and one or more .VOB files.

A file with the .VOB extension contains the actual multimedia data and is called a video object set. The location and format of the multimedia data stored in the video object set is defined by the associated .IFO file. In particular, .IFO files contain navigational data structures and a processor-independent interpreted language which specifies how the data structures are arranged.

The data structures themselves are composed of various, objects called "program chain objects", "program objects", and "cell objects". Program chain objects link related program objects (or particular scenes) within a title and their data structures govern the playback of the program objects. For example, a simple title may contain only one program chain. However, complex titles may contain two or more program chains to allow random access to a variety of programs. The multiple program chain title can play programs linearly, randomly or in a "shuffle" mode. Program chains allow a particular program sequence to be changed during playback. Thus, it is possible to change the program contact based on stored information. This type of operation is used in implementing "parental control" levels in DVD content. Parental control levels allow parents to control information content that they might find inappropriate (such as extremely violent or sexual material) for viewing by their children. Using parental control, the inappropriate or objectionable material can be removed from a playback and other material substituted without requiring several separate and complete programs.

Current DVD playback systems do allow a parent or supervisor to control the material accessed on a DVD content source. These DVD playback systems are typically located at the place of use and give direct control to the users, such as the parents or other supervisors. DVD content is being provided over other media sources, such as, for example, satellite media broadcasting, cable subscription broadcasting, and Internet access, among others. The transmission of media using DVD content leads to access problems when the content is allowable in one locale, but is prohibited in another. The access problems involve the situation of different community standards. For example, what might be allowed in New York City will not always play in Peoria and may actually be illegal. Further, community standards vary from country to country.

Unfortunately, there is no current system that can broadcast DVD content to different communities with different permissible ratings without having to select the most restrictive rating among the different communities. In other words, current technologies only allow the broadcasting of DVD source content at one parental control setting, regardless of the destination.

Accordingly, there is a need for a control mechanism that allows a DVD broadcast source to define downstream controls over the content viewed by machines receiving the content.

SUMMARY OF THE INVENTION

According to the present invention, a parental management controller for use in a DVD environment is disclosed that defines, in a distributive computer environment (DCE), department, country, or corporate controls over DVD content viewed by machines within the environment. The controller provides automated parental management installation on remote machines. It provides parental management enforcement on remote machines. It adjusts the default parental management enforcement level to local cultures and moral values. The controller also provides a logging of any parental management violations on local machines.

In one embodiment of the present invention, a digital versatile playback apparatus is provided that retrieves DVD content across the network, such as a DCE. The DVD playback apparatus comprises a DVD data stream receiver to receive the DVD content from the network. The playback apparatus further comprises a DVD content decoder to decode the DVD content for playback and the parental management controller, which permits DVD content decoding from any source location along the network path to the DVD playback apparatus. The parental management controller reviews each and every parental management control level applied to the content along the network path and as defined by the user of the DVD playback apparatus before allowing the DVD content decoder to decode the DVD content. If the DVD content fails to conform to the restrictive levels required by the user or network, then the DVD content will not be decoded for playback. The parental management controller may be placed in each DVD programming node within the DCE. As such, the parental management controller is able to provide installation of the parental management control level defined for the distributed computer environment to each DVD node in the DCE.

The parental management controller is capable of adjusting the default parental management control level to local cultures and moral values based on a location selection made by the user at the time of installation or at any other time desired by the user. Additionally, the controller can log any parental management violations on a local machine receiving the DVD content, where that local machine is within the DCE domain.

In accordance with another aspect of the present invention, a method for enforcing the parental management of content across the network is disclosed. The method is directed towards enforcing parental management of content across a network that transmits DVD content from one location to another location. The method includes the steps of determining the parental management control level at each location utilized along the transmission path of the DVD content, and selecting the parental management control level acceptable to each location along the DVD content path. Once the appropriate parental management control level has been established, then the system can begin playing the DVD content at the viewing location should it correspond to the selected parental management control level at that location.

To determine the parental management control level at each location, the method first determines the parental management control level allowed at the transmission location, then it determines the control level allowed at the viewing location, and lastly it transmits the viewing locations parental management control level to the transmission location. The parental management control levels can be established by local governments or by management in a corporate setting.

BRIEF DESCRIPTION OF THE DRAWINGS

The above and other features, objects and advantages of the invention will be better understood by referring to the following detailed description in conjunction with the accompanying drawing in which.

DETAILED DESCRIPTION

Figure 1:
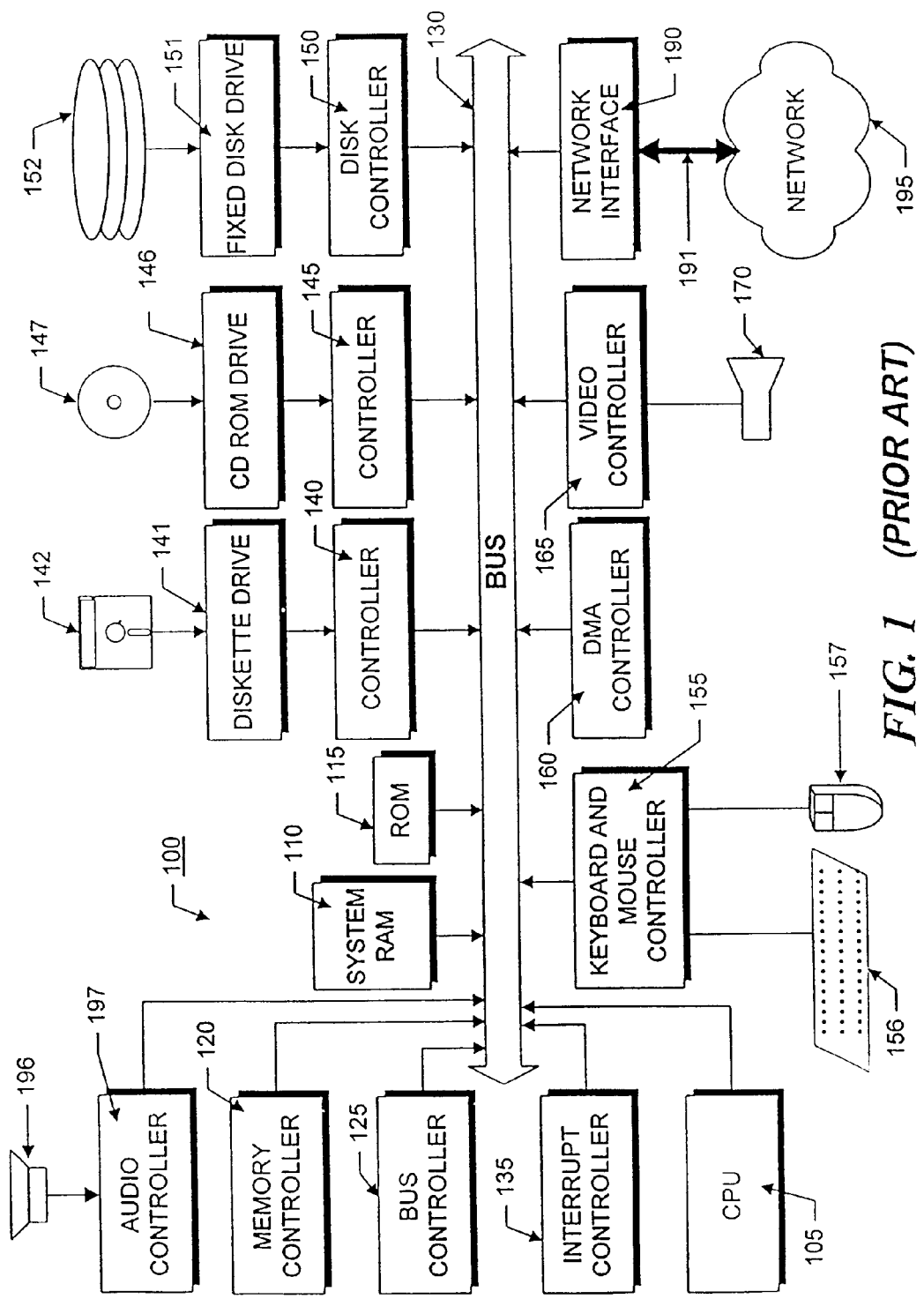
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD, ROM drive 146 which is, in turn, connected to bus 130 by controller 145. Hard disc 152 is part of a fixed disc drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among other things. In particular, an operating system resident in system memory and running on CPU 105 coordinates the operation of the other elements of computer system 100. The present invention may be implemented with any number of commercially available operating systems including OS/2, UNIX and DOS, etc. One or more applications, such as Lotus NOTES™, commercially available from Lotus Development Corp., Cambridge, Mass. may also run on the CPU 105. If the operating system is a true multitasking operating system, such as OS/2, multiple applications may execute simultaneously.

Figure 2:
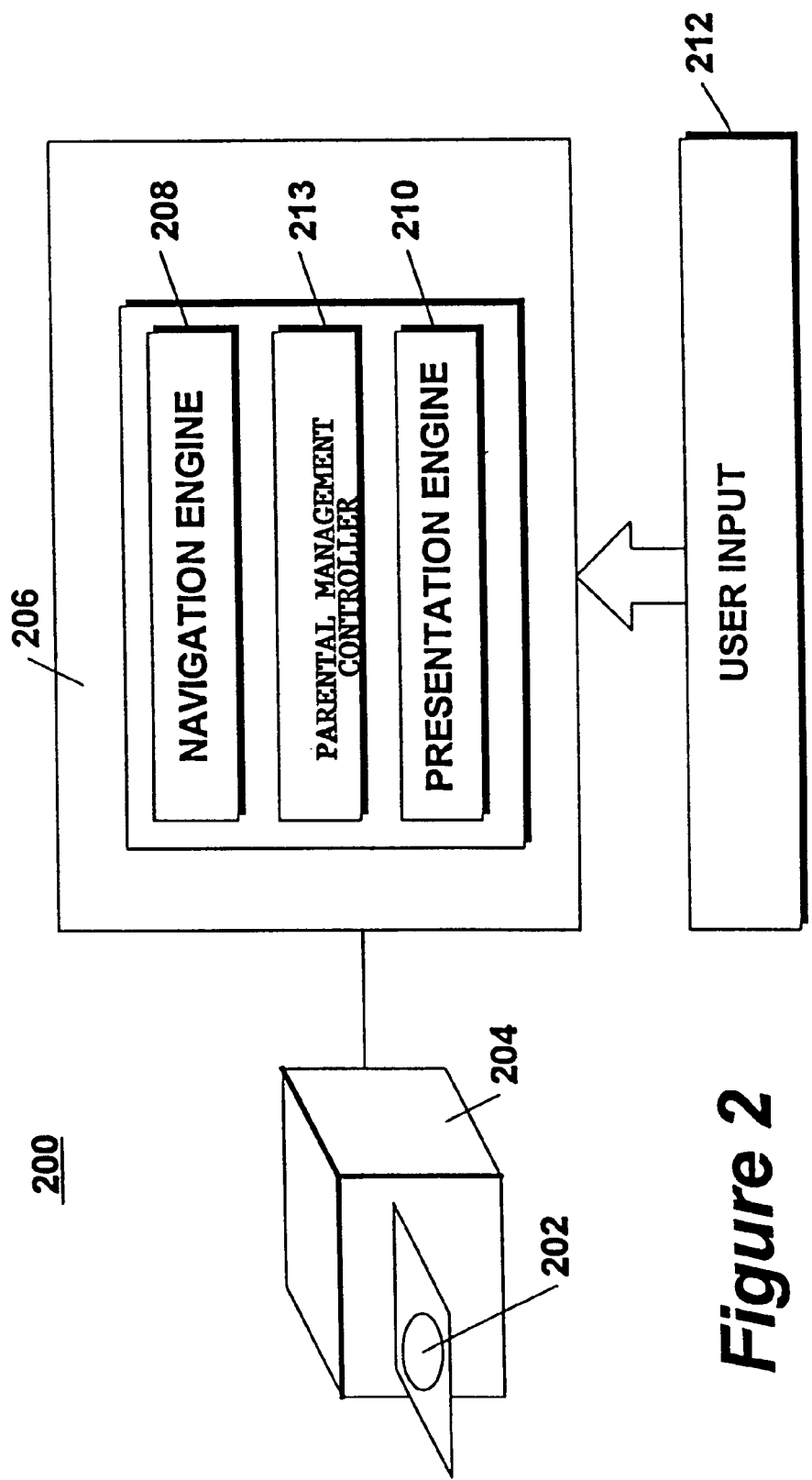
FIG. 2 is a conceptual diagram of the elements comprising an Interactive DVD player in accordance with the present invention.

FIG. 2 illustrates conceptually the main components of a system 200 in accordance with the present invention. FIG. 2 shows a DVD-ROM drive 204 connected to a computer 206. Use of the DVD-ROM drive 204 with the computer 206 should not be construed as a limitation of the invention, however, since other DVD source mechanisms such as the internet, digital satellite dishes, etc., may be substituted for the DVD-ROM drive 204. In addition, the DVD-ROM drive 204 may also be a drive suitable for internal mounting in computer 206.

The DVD drive 204 receives a disc 202 containing compressed and encoded information, which has been coded in accordance with the DVD 1.0 Specification for Read-Only Disc, and disc 202 may contain up to seventeen gigabytes of information. The computer 206 includes a driver, not shown, for enabling the operating system in the computer 206 to control and exchange information with the drive 204. Computer 206 also includes one or more input devices 212 that receive input from a user.

The computer 206 also includes a control and playback program shown schematically in FIG. 2 as having a navigation object 208 with logic for reading data from the drive. A presentation engine 210 includes decompressing and decoding routines for decoding the information on the disc 202 and routines for formatting the information for display. For example, the audio information may be compressed by means of conventional compression technique known as Dolby® AC-3® compression, also known as "Dolby® Digital" compression. Video information may be compressed using a compression technique known as Moving Picture Experts Group-2 (MPEG-2). A parental management controller 212 is also provided to allow a user to define the viewing restriction level of the DVD content being decoded. The parental management controller 212 can decode the content stream from either a DVD disc playing on DVD player 204 or from an outside source, such as shown in FIG. 3, as will be described below.

In an illustrative embodiment, the software elements of system 200 may be implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things, like people and computers, and they can model abstract concepts like numbers or geometrical designs.

Figure 3:
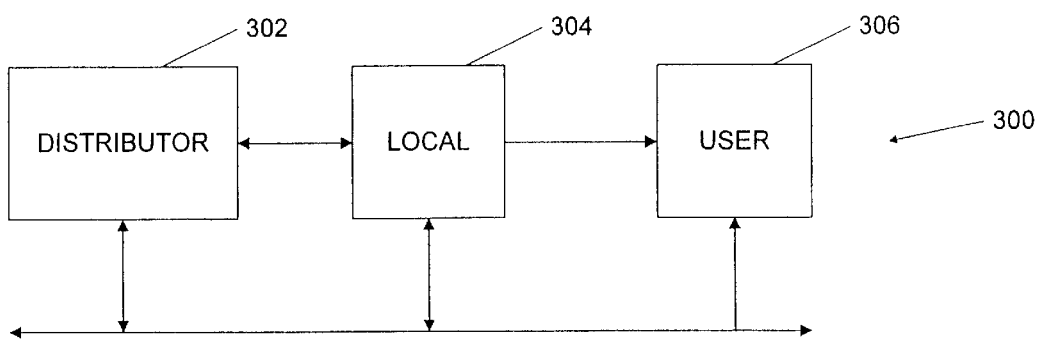
FIG. 3 is a block diagram of an enterprise utilizing the DVD player of FIG. 2.

A distributive content environment 300 is depicted in the block diagram of FIG. 3. The distributive content environment 300 includes a primary control distributor 302, which is coupled to a plurality of intermediate and receiving stations downstream from distributor 302. The receiving stations may be a local station 304 or an end user 306. Additional receiving stations and intermediate stations such as local station 304 and end user 306 are allowed and are not illustrated for sake of simplification. Primary control distributor 302, local station 304, and end user 306 are each based on computer 206. Distributor 302, local station 304, and end user 306 are communicatively coupled to be able to transmit and receive data.

Distributive content environment 300 can be a corporation that establishes a maximum level of DVD content that may be viewed on the corporate network. The corporation may be, for example, a place of business that provides DVD content to corporate participants. The corporation may also be a cable company providing either television content or Internet access, or both. Other possible environments include movie subscription services such as pay-per-view on cable access or hotel/motel cable viewing systems.

According to the principles of the invention, a mechanism is provided, such as the parental management controller 212, that allows the corporation, operating in the distributive content environment 300, to define department, country, or corporate controls over content viewed by machines within the environment. The invention provides automated parental management installation on remote machines. It provides parental management enforcement on remote machines. It adjusts the default parental management enforcement level to local cultures and moral values. The invention also provides a logging of any parental management violations on local machines.

Several definitions are given here relating to departmental or corporate parental management. First, a corporation must define the maximum level of DVD content that may be viewed on the corporate network. The standards follow that currently utilized by the motion picture industry in the United States. The ratings include G, PG, PG-13, R, NC17, and NR. Other ratings are possible. The given ratings are followed to select content meeting the United States standards. Once the requested content is selected within the parameters of the given ratings system, the content is played back. Second, a sector, or local station 304 (or business unit), may optionally define the maximum level of DVD content that may be viewed on that particular local station 304. Third, a department, or user 306, may optionally define the maximum level of DVD content that maybe be viewed in that particular department.

These parental control levels are stored on a master server, such as distributor 302. Distributor 302 serves as a master server or as a distributed server if used in different sectors or departments. An object that conforms to Distributed Computing Environment (DCE) and is well known to those skilled in the art is used to access the parental control information. Any machine on the network may access this object, but only machines with specific levels of access may modify values stored in the object.

For example, a corporation may decide that all content, up to R content, may be viewed on the corporate network. R-rated content, however, may not be legal in certain countries where a particular corporate sector operates. In that case, the sector decides the parent control for all DVD content viewed in that sector. For example, the sector may only allow PG-13 content to be viewed. Consequently, although the corporation allows R content to be viewed, only PG-13 content may be viewed in that sector.

Once the appropriate levels are defined and stored on a master server, the corporation must define either (1) the department and sector for each employee or end user; or (2) the internet protocol (IP) addresses per department or sector. This enables the distributor 302 to control the content sent to a user who is temporarily using someone else's machine.

To provide parental control over an enterprise such as that in FIG. 3, local, sector, and corporate information must be gathered from across the enterprise. The information includes the IP address and the parental control object name of the master server. Next, each individual user is given the option of defining the parental level they desire. The individual user level may not exceed the strictest of the corporate, sector, departmental, or local controls. Each user's preference is stored on the local machine and not on the master server. The preferences may be stored on the LAD master server in an alternative embodiment and queried each time a user selects a DVD content title to access. The information stored on each individual machine includes a flag indicating that parental control is network enabled and the individual settings for parental control. The information can be encrypted.

Figure 4:
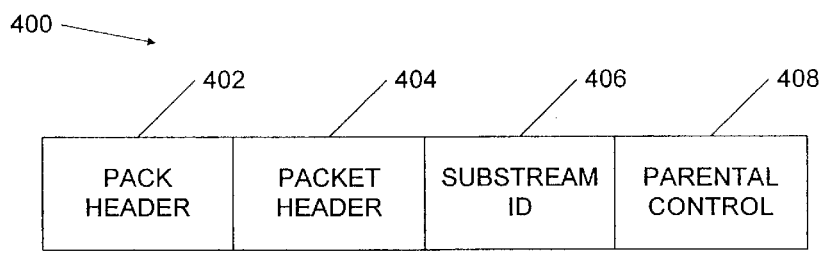
FIG. 4 is a diagram of a network access packet with parental control data in accordance with the present invention.

Referring to FIG. 4, a broadcast transmission pack 400 is shown comprising the pack header 402, packet header 404, sub stream_ID 406, and a parental control flag 408. In the illustrative embodiment, packet header 402 may be implemented with 14 bytes of digital information. Packet header 404 may be implemented with either 9 or 14 bytes of digital information while substream_ID 406 may be implemented with as little as a single byte. The parental control packet 408 may comprise from 8 to 36 bytes of information. The information stored in parental control packet 408 is that of the allowable parental management rating permitted on that remote machine, as well as the department, sector, and corporate values, each of which is 8 bytes plus a reserved padding byte.

Figure 5:
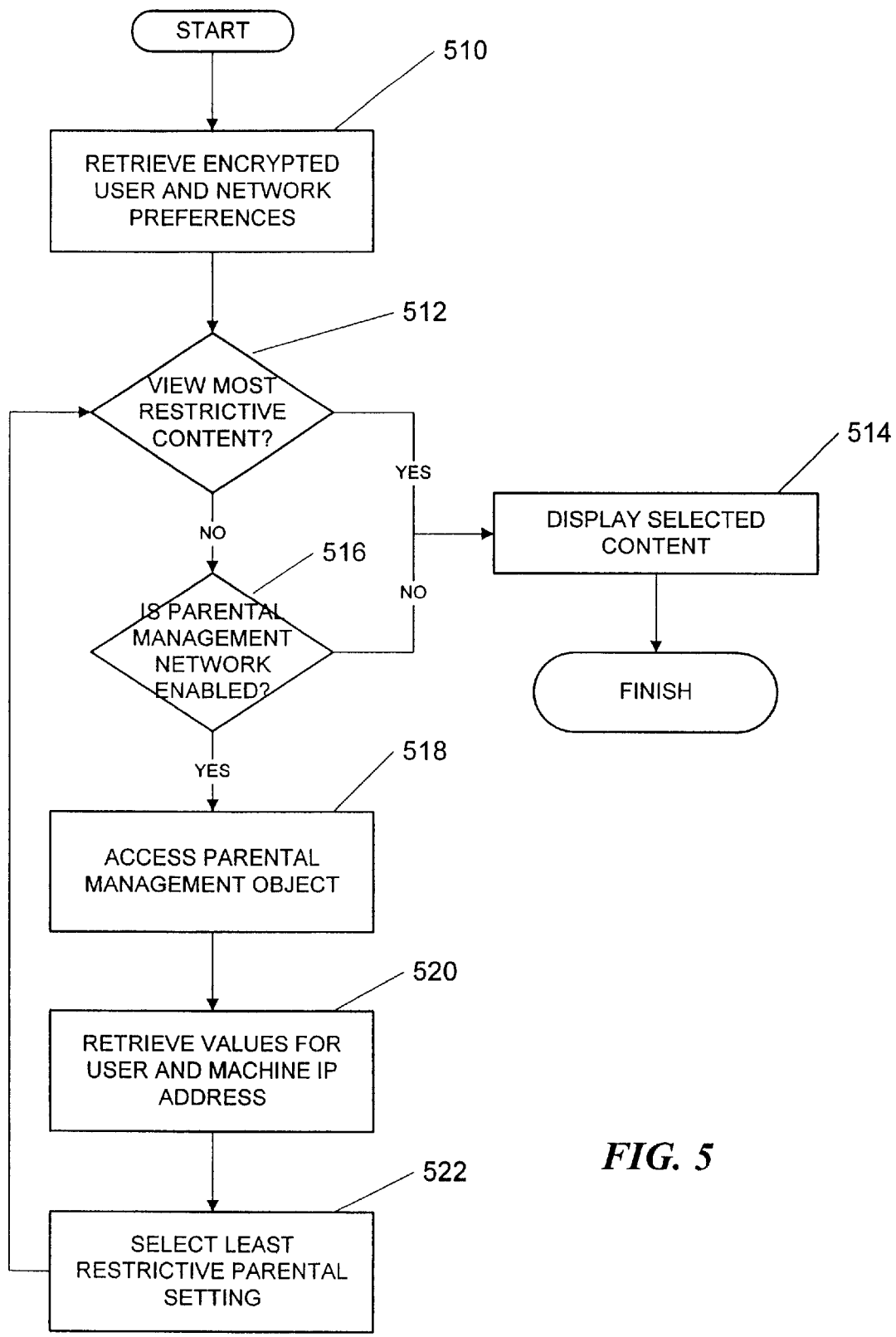
FIG. 5 is a flow chart that illustrates the method of accessing remote data using a network access packet with parental control in accordance with the principles of the present invention.

At the next stage, a user or client makes a request to view a DVD title downloaded from the distributor server 302. An illustrative flowchart is depicted in FIG. 5 of how the distributor server 302 selects the approved rating based on the several settings that may need to be reviewed. First, in step 510 server 302 retrieves the encrypted user and network preferences stored either at the local machine or on the server. This information is transferred in packet 408. Next, in step 512, the system determines if the user only wishes to see the most restrictive rated or G rated content. If the most restrictive rated content has been selected, then the system advances to step 514 and displays the DVD content utilizing the selected parental management setting; otherwise, the system proceeds to step 516.

In step 516, the system determines if the parental management network is enabled per the information stored in packet 408. If the parental management network is not enabled, then the system proceeds to step 514 to play the content selected based on the user's setting for parental management; otherwise, the system proceeds to step 518.

In step 518, the system accesses the parental management object on the IP network. Next, in step 520, the system retrieves the values for departmental, sector, and corporate values for both the current user and the IP address of the machine used to playback the requested DVD content. Based on a check of the various settings, the system, in step 522, chooses the most restrictive parental setting. The most restrictive setting is the setting viewable by the widest possible audience. G-rated content is the most restrictive setting for all audiences and NC17 is the least restrictive setting for adults over 17 only with the other ratings falling between G and NC17. If the parental settings associated with the IP address are more restrictive than that of the user's department, the system utilizes the settings associated with the IP address. The IP address of the local machine determines which rating is to be accessed. So if a user travels outside the user's country that has a different standard, the user's access will be determined by that country's standards.

The rating system described here is based on the movie ratings system of the United States. Other rating systems can also be utilized such as a rating system that ranges from 1–8 utilized by the DVD system. 1 is the most restrictive and corresponds to the G rating in the United States. 8 is the least restrictive, meaning if 8 is selected, then the player is able to play all content regardless of rating. This rating system is country independent. NC-17 corresponds to a rating of 7 in the DVD standard.

A software implementation of the above described embodiment(s) may comprise a series of computer instructions either fixed on a tangible medium, such as a computer readable media, e.g. diskette 142, CD-ROM 147, ROM. 115, or fixed disc 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate object or processor instructions, or in hybrid implementations which utilize a combination of hardware logic, software logic and/or firmware to achieve the same results, the specific configuration of logic and/or instructions utilized to achieve a particular function, as well as other modifications to the inventive concept are intended to be covered by the appended claims.

What is claimed is:

1. A method of enforcing parental management of content across a network transmitting digital versatile disc (DVD) content from a transmission location, to a viewing location, comprising the steps of:
   a. determining the parental management control level at each location utilized along a path to transmit DVD content from the transmission location to the viewing location;
   b. selecting the parental management control level acceptable to each location along the DVD content path.

2. The method of claim 1 further comprising step c playing the DVD content at the viewing location corresponding to the selected parental management control level.

3. The method of claim 1 wherein step a comprises:
   determining the parental management control level allowed at the transmission location;
   determining the parental management control level allowed at the viewing location;
   transmitting the viewing location's parental management control level to the transmission location.

4. The method of claim 1 wherein step a comprises determining the parental management control level based on governmental restrictions of the viewing location.

5. A digital versatile disc (DVD) playback apparatus that retrieves DVD content across a network, comprising:
   a DVD data stream receiver to receive the DVD content from the network, the DVD content having a selected parental management control level;
   DVD content decoder to decode the DVD content for playback; and
   a parental management controller to permit DVD content decoding from a source location by the DVD content decoder based upon a review of the selected parental management control levels at the source location and at least one of a plurality of control point locations along the network path and as defined by the user of the DVD playback apparatus through the parental management controller, each control point having a defined parental management control level.

6. The apparatus of claim 5 wherein the DVD content passes through a plurality of control points, each control point having a defined parental management control level to be reviewed.

7. The apparatus of claim 5 wherein the parental management controller adjusts a default parental management control level to local cultures and moral values based on a location selection.

8. The apparatus of claim 5 wherein the parental management controller logs any parental management violations on a local machine receiving the DVD content.

9. The apparatus of claim 5 wherein the parental management controller provides automatic installation of the parental management control level defined for a distributed computer environment coupled to the DVD control apparatus.

10. A computer program product for enforcing parental management of content across a network transmitting digital versatile disc (DVD) content from a transmission location to a viewing location, the computer program product comprising a computer usable medium having computer readable code thereon comprising:
    program code to determine the parental management control level at each location utilized along a path to transmit DVD content from the transmission location to the viewing location;
    program code to select the parental management control level acceptable to each location along the DVD content path.

11. The computer program product of claim 10 further comprising program code to play the DVD content at the viewing location corresponding to the selected parental management control level.

12. The computer program product of claim 10 wherein the program code to determine the parental management control level comprises:
    program code to determine the parental management control level allowed at the transmission location;
    program code to determine the parental management control level allowed at the viewing location;
    program code to transmit the viewing location's parental management control level to the transmission location.

13. The computer program product of claim 10 wherein the determining program code comprises program code for determining the parental management control level based on governmental restrictions of the viewing location.

* * * * *